US00RE36680E

United States Patent [19]

Zdepski et al.

[11] E Patent Number: Re. 36,680

[45] Reissued Date of Patent: May 2, 2000

[54] MOVING-IMAGE SIGNAL ENCODING APPARATUS WITH VARIABLY SELECTED QUANTIZATION STEP SIZE

[75] Inventors: Joel W. Zdepski, Hunterdon; Kuriacose Joseph, Middlesex, both of N.J.; Masahiro Wakamori; Takeshi Yukitake, both of Yokohama, Japan

[73] Assignee: Matsushita Electric Industrial Co., Ltd., Osaka, Japan

[21] Appl. No.: 08/600,653

[22] Filed: Feb. 13, 1996

Related U.S. Patent Documents

Reissue of:

[64] Patent No.: 5,089,888
Issued: Feb. 18, 1992
Appl. No.: 07/628,697
Filed: Dec. 14, 1990

U.S. Applications:

[63] Continuation of application No. 08/198,738, Feb. 18, 1994.

[30] Foreign Application Priority Data

Dec. 20, 1989 [JP] Japan ..... 1-330622

[51] Int. Cl.[7] ..... H04N 7/26

[52] U.S. Cl. ..... 348/419; 348/409

[58] Field of Search ..... 348/419, 409, 348/420, 418, 415–417

[56] References Cited

U.S. PATENT DOCUMENTS

| | | | |
|---|---|---|---|
| 4,816,914 | 3/1989 | Ericsson . | |
| 4,831,439 | 5/1989 | Fedele et al. | 348/419 |
| 4,888,640 | 12/1989 | Acampora et al. | 348/419 |
| 5,134,476 | 7/1992 | Aravind et al. . | |

FOREIGN PATENT DOCUMENTS

| | | |
|---|---|---|
| 61-157194 | 7/1986 | Japan . |
| 63-121372 | 5/1988 | Japan . |
| 3-66281 | 3/1991 | Japan . |

OTHER PUBLICATIONS

CCITT; Geneva 1989 vol. III Fascicle 111.6.
CCITT H.261; Geneva 1990.
TTC Standards, 1991.

*Primary Examiner*—Victor R. Kostak
*Attorney, Agent, or Firm*—Lowe Hauptman Gopstein Gilman & Berner

[57] ABSTRACT

A moving-image signal encoding apparatus includes a transmission buffer memory. A first quantization step size for a normal block other than a refreshed block is determined on the basis of an occupied capacity of the buffer memory. A second quantization step size for the refreshed block is determined on the basis of the first quantization step size. A refreshment instruction signal is generated. One of the first quantization step size and the second quantization step size is selected in response to the refreshment instruction signal.

12 Claims, 6 Drawing Sheets

MOVING-IMAGE SIGNAL ENCODING APPARATUS WITH VARIABLY SELECTED QUANTIZATION STEP SIZE

Matter enclosed in heavy brackets [ ] appears in the original patent but forms no part of this reissue specification; matter printed in italics indicates the additions made by reissue.

This is a continuation of Ser. No. 08/190,738 filed Feb. 18, 1994, which is a reissue of Ser. No. 07/628,697 filed Dec. 14, 1990 U.S. Pat. No. 5,089,888.

BACKGROUND OF THE INVENTION

This invention relates to an apparatus for encoding a signal representing moving images or pictures which is usable in various systems such as a video-telephone system or a conference television system.

Some video-telephone systems and conference television systems have an apparatus for encoding a moving-image signal. In general, such a moving-image signal encoding apparatus executes digital signal processing for compressing image data by use of image-data correlation, for compressing the image data by quantization, and for encoding the image data into codes of a predetermined format. As will be explained later, a prior art moving-image signal encoding apparatus has a problem.

SUMMARY OF THE INVENTION

It is an object of this invention to provide an improved moving-image signal encoding apparatus.

A first aspect of this invention provides a moving-image signal encoding apparatus comprising a transmission buffer memory; means for determining a first quantization step size for a normal block other than a refreshed block on the basis of an occupied capacity of the buffer memory; means for determining a second quantization step size for the refreshed block on the basis of the first quantization step size; means for generating a refreshment instruction signal; and means for selecting one of the first quantization step size and the second quantization step size in response to the refreshment instruction signal.

A second aspect of this invention provides a moving-image signal encoding apparatus comprising a transmission buffer memory; means for determining a first quantization step size for a normal block other than a refreshed block on the basis of an occupied capacity of the buffer memory; means for determining a second quantization step size for the refreshed block in a moving region on the basis of the first quantization step size; means for determining a third quantization step size for the refreshed block in a stationary region on the basis of the first quantization step size; means for generating a refreshment instruction signal; means for generating a moving/stationary information signal; and means for selecting one of the first quantization step size, the second quantization step size, and the third quantization step size in response to the refreshment instruction signal and the moving/stationary information signal.

A third aspect of this invention provides a moving-image signal encoding apparatus comprising means for refreshing a portion of image data; means for quantizing information in the image data with a variable quantization step size; and means for varying the quantization step size in the quantizing means in response to whether or not the information quantized by the quantizing means corresponds to the refreshed portion of the image data.

DESCRIPTION OF THE PRIOR ART

Figure 1:
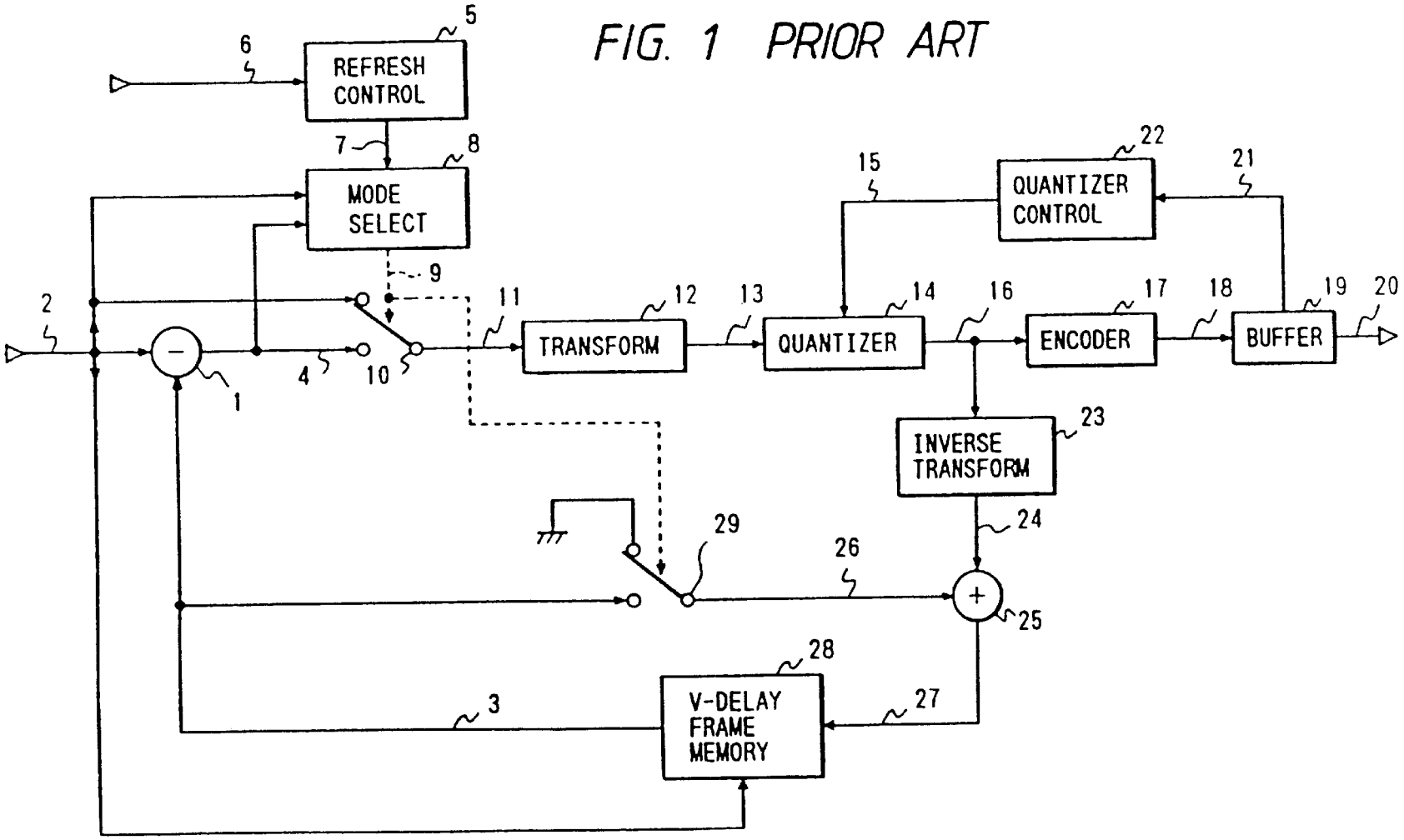
FIG. 1 PRIOR ART
FIG. 1 is a block diagram of a prior art moving-image signal encoding apparatus.

With reference to FIG. 1, a prior art moving-image signal encoding apparatus includes a subtracter 1 receiving a digital input image signal 2 and a digital inter-frame prediction signal 3 and outputting a prediction error signal 4 equal to the difference between the signals 2 and 3.

A refreshment controller 5 receives a timing signal 6 and outputs a refreshment instruction signal 7 in response to the timing signal 6. A data-processing mode selector 8 receives the input image signal 2, the prediction error signal 4, and the refreshment instruction signal 7, and outputs a change control signal 9 in response to the signals 2, 4, and 7. As will be made clear later, the data-processing mode selector 8 functions to execute the selection between inter-frame data processing and intra-frame data processing. A switch 10 receives the input image signal 2, the prediction error signal 4, and the change control signal 9. The switch 10 is connected to the input terminal of an orthogonal transform device 12. The switch 10 selects one of the input image signal 2 and the prediction error signal 4, and transmits the selected signal to the orthogonal transform device 12 as a signal 11 to be subjected to orthogonal transform.

The signal 11 selected by the switch 10 is subjected to predetermined orthogonal transform by the orthogonal transform device 12 so that transform coefficients are generated on the basis of the signal 11. Data 13 representing the transform coefficients are outputted from the orthogonal transform device 12.

A quantizer 14 receives the transform coefficient data 13 and also data 15 representing a quantization step size. The quantizer 14 quantizes the transform coefficient data 13 with the quantization step size represented by the data 14, and converts the transform coefficient data 13 into data 16 representing second transform coefficients. An encoder 17 receives the second transform coefficient data 16 and encodes the data 16 into codes 18 of a predetermined format. The codes 18 are outputted from the encoder 17. A transmission buffer 19 including a memory receives the codes 18 and temporarily stores the codes 18. The codes 18 are then outputted from the transmission buffer 19 generates a signal 21 representing the amount of codes remaining in the internal memory, that is, representing the size of an area of the internal memory which is occupied by the codes. A quantizer controller 22 receives the buffer remaining-code-amount signal 21 and generates the quantization step size data 15 on the basis of the buffer remaining-code-amount signal 21. The quantization step size data 15 are outputted from the quantizer controller 22 to the quantizer 14. As a result, the quantization step size used by the quantizer 14 is controlled in response to the buffer remaining-code-amount.

An inverse orthogonal transform device 23 receives the second transform coefficient data 16. The second transform coefficient data 16 are subjected by the inverse orthogonal transform device 23 to predetermined inverse orthogonal transform, and are converted back to a reproduction signal 24. The reproduction signal 24 is outputted from the inverse orthogonal transform device 23. An adder 25 receives the reproduction signal 24. A switch 29 receives the inter-frame prediction signal 3, the change control signal 9, and a zero signal representing "0". The switch 29 selects one of the inter-frame prediction signal 3 and the zero signal in response to the change control signal 9, and outputs a signal 26 equal to the selected signal. The adder 25 receives the output signal 26 from the switch 29. The adder 25 adds the reproduction signal 24 and the switch output signal 26, and combines the signals 24 and 26 into a decoded signal 27. A section 28 including a variable-delay circuit and a frame memory receives the decoded signal 27 and the input image signal 2. The variable-delay frame memory 28 temporarily stores the decoded signal 27, and generates the inter-frame prediction signal 3 on the basis of the stored decoded signal 27 and the input image signal 2. The inter-frame prediction signal 3 is outputted from the variable-delay frame memory 28. As will be made clear later, the inter-frame prediction signal 3 is a motion-compensated signal.

The prior art moving-image signal encoding apparatus of FIG. 1 will be further described. A refreshing process is executed for compensating a difference in accuracy between an encoder of a transmitter side and a decoder of a receiver side, and also for compensating errors of codes which occur during the transmission of the codes. One frame represented by the signals 11 and 27 is separated into blocks each having M pixels by N lines, where M and N denote predetermined natural numbers. The refreshing process includes a scanning process such that blocks are sequentially and periodically selected as an object to be refreshed. The refreshed block is changed among all the blocks so that all the blocks will be refreshed during a given time. A decision is made as to whether or not refreshment is done for each of the blocks. The refreshment controller 5 outputs the refreshment instruction signal 7 in an active state to the data-processing mode selector 8 for each of blocks to be refreshed. The ratio of the number of refreshed blocks in a frame to the total number of blocks composing one frame is equal to a predetermined ratio chosen such that refreshing all the blocks will be completed for about 10 seconds. The period of refreshing all the blocks is referred to as a refreshment period.

In the case where the refreshment instruction signal 7 is active, the data-processing mode selector 8 commands selection of intra-frame data processing. In the case where the refreshment instruction signal 7 is inactive, the data-processing mode selector 8 commands selection of one of inter-frame data processing and intra-frame data processing in response to the input image signal 2 and the prediction error signal 4. When the selection of the intra-frame data processing is commanded, the switch 10 is controlled by the change control signal 9 so that the input image signal 2 will be selected by the switch 9 to enable the intra-frame data processing. When the selection of the inter-frame data processing is commanded, the switch 10 is controlled by the change control signal 9 so that the prediction error signal 4 will be selected by the switch 9 to enable the inter-frame data processing.

The quantizer 14 is of the linear type. As described previously, the transform coefficients 13 outputted from the orthogonal transform device 12 are quantized by the quantizer 14 with the quantization step size represented by the data 15, so that the transform coefficients 13 are converted by the quantizer 14 into the second transform coefficients 16. The quantizer controller 22 varies the quantization step size in accordance with the buffer remaining-code-amount represented by the signal 21. The quantizer 14 and the encoder 17 are related so that the number of bits of the output codes 18 from the encoder 17 will depend on the quantization step size used by the quantizer 14. The quantizer 14, the encoder 17, the transmission buffer 19, and the quantizer controller 22 form a closed-loop control circuit which serves to maintain the quantity (the amount or the number of bits) of codes in the transmission buffer 19 at or below a desired quantity.

As described previously, the signal selection by the switch 29 is changed in response to the change control signal 9. When the selection of the inter-frame data processing is commanded by the data-processing mode selector 8, the switch 29 is controlled by the change control signal 9 so that the inter-frame prediction signal 3 will be selected by the switch 29 to enable the inter-frame data processing. When the selection of the intra-frame data processing is commanded by the data-processing mode selector 8, the switch 29 is controlled by the change control signal 9 so that the zero signal will be selected by the switch 29 to enable the intra-frame data processing. The output signal 26 from the switch 29 and the output reproduction signal 24 form the inverse transform device 23 are combined into the decoded signal 27 by the adder 25. The decoded signal 27 is stored into a store section of the variable-delay frame memory 28. The variable-delay frame memory 28 has a motion detector which compares the stored decoded signal 27 and the input image signal 2, and which detects a motion vector on the basis of the result of the comparison between the signals 27 and 2. The detected motion vector represents a motion of the image represented by the input image signal 2. The variable-delay frame memory 28 has a motion compensator which subjects the stored decoded signal 27 to motion compensation in response to the motion vector, and thereby which converts the stored decoded signal 27 into the motion-compensated inter-frame prediction signal 3.

Figure 2:
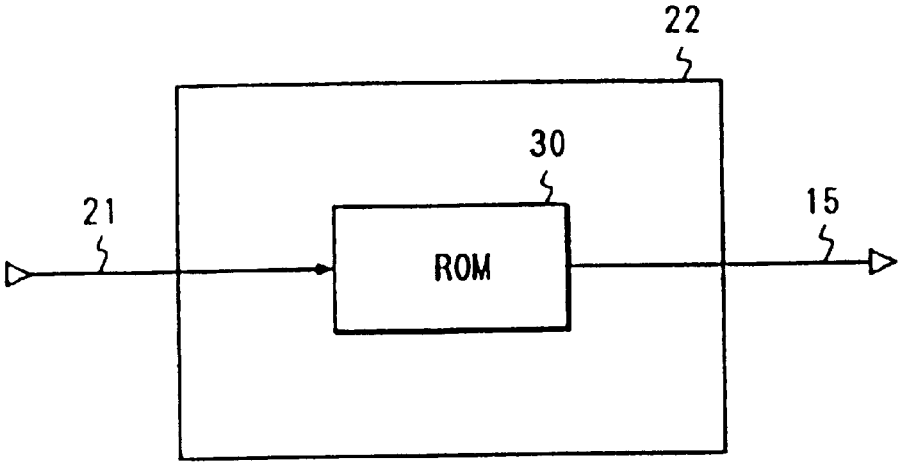
FIG. 2 PRIOR ART
FIG. 2 is a block diagram of the quantizer controller of FIG. 1.
Figure 3:
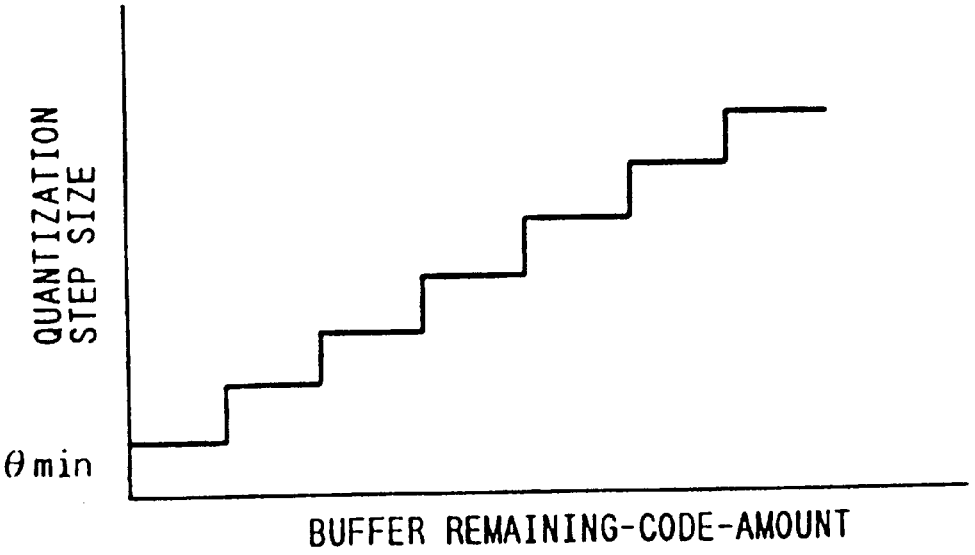
FIG. 3 PRIOR ART
FIG. 3 is a diagram showing the relation between a quantization step size and a buffer remaining-code-amount in the apparatus of FIG. 1.

As shown in FIG. 2, the quantizer controller 22 includes a ROM 30 storing data representing different quantization step sizes. The buffer remaining-code-amount signal 21 is fed to the ROM 30 as an address signal, and the ROM 30 outputs data 15 of a quantization step size which varies as a function of the buffer remaining-code-amount represented by the signal 21. As shown in FIG. 3, the quantization step size represented by the data 15 is approximately proportional to the buffer remaining-code-amount represented by the signal 21 according to a stepwise function.

In the prior art moving-image encoding apparatus of FIG. 1, the quantization step size used by the quantizer 14 is independent of whether or not the block quantized by the quantizer 14 is subjected to refreshment, so that a refreshed block tends to be low in image quality.

DESCRIPTION OF THE PREFERRED EMBODIMENT

Figure 4:
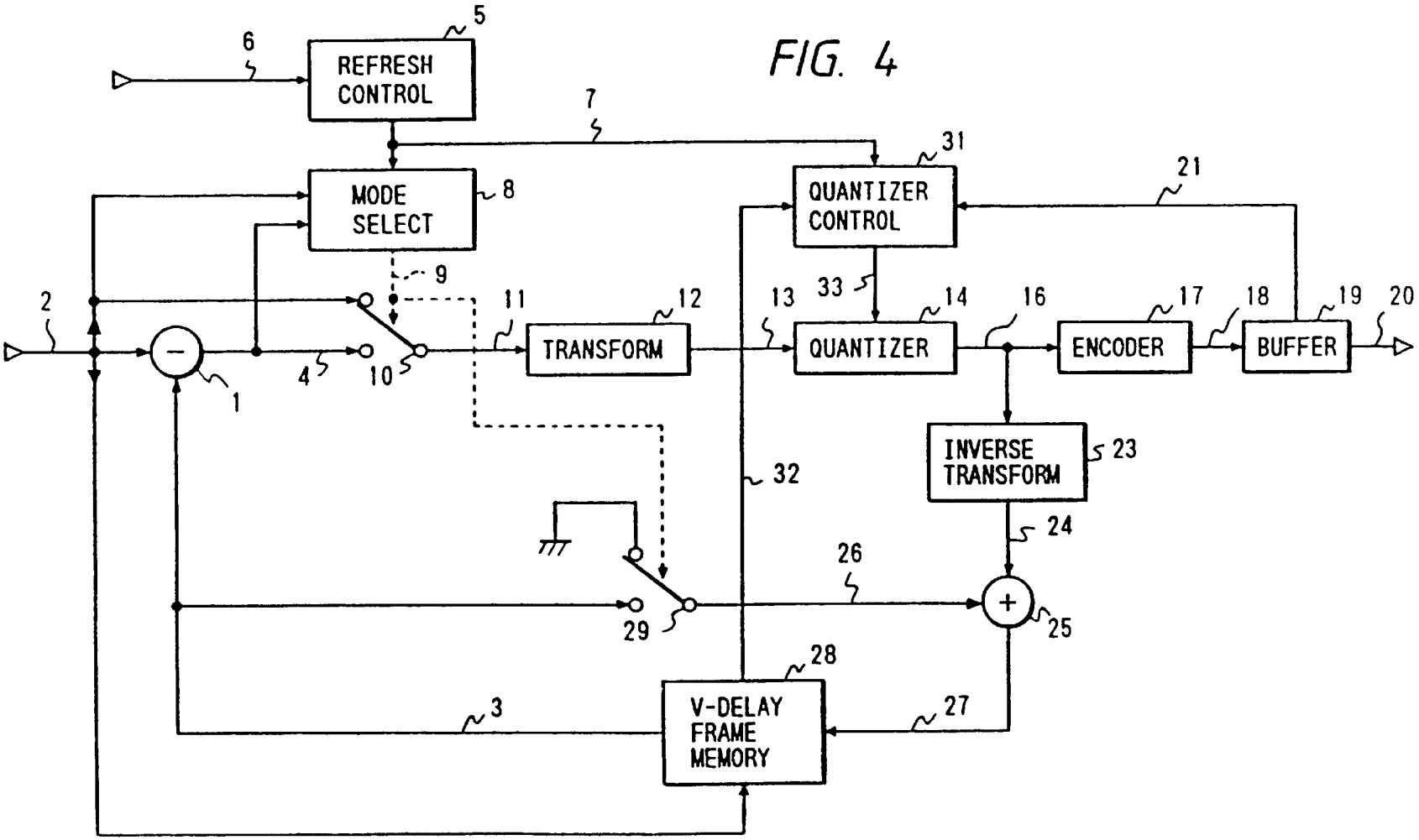
FIG. 4 is a block diagram of a moving-image signal encoding apparatus according to an embodiment of this invention.

With reference to FIG. 4, a moving-image signal encoding apparatus according to an embodiment of this invention includes a subtracter 1 receiving an input digital image signal 2 and an inter-frame prediction signal 3 and outputting a prediction error signal 4 equal to the difference between the signals 2 and 3.

A refreshment controller 5 receives a timing signal 6 and outputs a refreshment instruction signal 7 in response to the timing signal 6. A data-processing mode selector 8 receives the input image signal 2, the prediction error signal 4, and the refreshment instruction signal 7, and outputs a change control signal 9 in response to the signals 2, 4, and 7. As will be made clear later, the data-processing mode selector 8 functions to execute selection between inter-frame data processing and intra-frame data processing. A switch 10 receives the input image signal 2, the prediction error signal 4, and the change control signal 9. The switch 10 is connected to the input terminal of an orthogonal transform device 12. The switch 10 selects one of the input image signal 2 and the prediction error signal 4, and transmits the selected signal to the orthogonal transform device 12 as a signal 11 to be subjected to orthogonal transform.

The signal 11 selected by the switch 10 is subjected to predetermined orthogonal transform by the orthogonal transform device 12 so that transform coefficients are generated on the basis of the signal 11. Data 13 representing the transform coefficients are outputted from the orthogonal transform device 12.

A quantizer 14 receives the transform coefficient data 13 and also data 33 representing a quantization step size. The quantizer 14 quantizes the transform coefficient data 13 with the quantization step size represented by the data 33, and converts the transform coefficient data 13 into data 16 representing second transform coefficients. An encoder 17 receives the second transform coefficient data 16 and encodes the data 16 into codes 18 of a predetermined format. The codes 18 are outputted from the encoder 17. A transmission buffer 19 including a memory receives the codes 18 and temporarily stores the codes 18. The codes 18 are then outputted from the transmission buffer 19 as a transmission signal 20. The transmission buffer 19 generates a signal 21 representing the amount of codes remaining in the internal memory, that is, representing the size of an area of the internal memory which is occupied by the codes. A quantizer controller 31 receives the refreshment instruction signal 7, the buffer remaining-code-amount signal 21, and a signal 32 representative of moving/stationary information, and generates the quantization step size data 33 on the basis of the signals 7, 21, and 32. The quantization step size data 33 are outputted from the quantizer controller 31 to the quantizer 14. As a result, the quantization step size used by the quantizer 14 is controlled in response to the refreshment instruction signal 7, the buffer remaining-code-amount signal 21, and the moving/stationary information signal 32.

An inverse orthogonal transform device 23 receives the second transform coefficient data 16. The second transform coefficient data 16 are subjected by the inverse orthogonal transform device 23 to predetermined inverse orthogonal transform, and are converted back to a reproduction signal 24. The reproduction signal 24 is outputted from the inverse orthogonal transform device 23. An adder 25 receives the reproduction signal 24. A switch 29 receives the inter-frame prediction signal 3, the change control signal 9, and a zero signal representing "0". The switch 29 selects one of the inter-frame prediction signal 3 and the zero signal in response to the change control signal 9, and outputs a signal 26 equal to the selected signal. The adder 25 receives the output signal 26 from the switch 29. The adder 25 adds the reproduction signal 24 and the switch output signal 26, and combines the signals 24 and 26 into a decoded signal 27. A section 28 including a variable-delay circuit and a frame memory receives the decoded signal 27 and the input image signal 2. The variable-delay frame memory 28 temporarily stores the decoded signal 27, and generates the inter-frame prediction signal 3 and the moving/stationary information signal 32 on the basis of the stored decoded signal 27 and the input image signal 2. The inter-frame prediction signal 3 and the moving/stationary information signal 32 are outputted from the variable-delay frame memory 28. As will be made clear later, the inter-frame prediction signal 3 is a motion-compensated signal.

Figure 10:
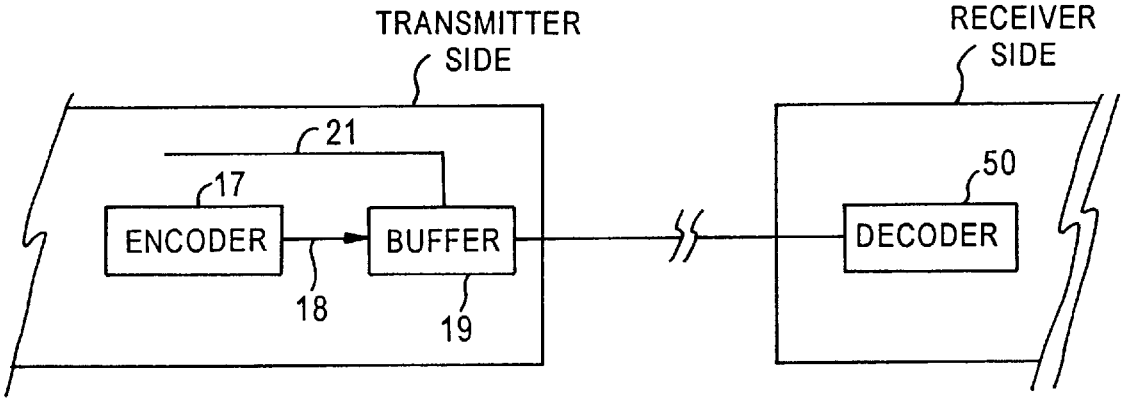
*FIG. 10 is a block diagram of a system including a receiver side and a transmitter side.*

The moving-image signal encoding apparatus of FIG. 4 will be further described. A refreshing process is executed for compensating a difference in accuracy between an encoder of a transmitter side and a decoder of a receiver side, and also for compensating errors of codes which occur during the transmission of the codes. *A combined system, including encoder 17 in a transmitter of a system in accordance with the invention, and a decoder 50 in a receiver of the system, for decoding an encoded signal from the transmitter, is shown in FIG. 10.* One frame represented by the signals 11 and 27 is separated into blocks each having M pixels by N lines, where M and N denote predetermined natural numbers. The refreshing process includes a scanning process such that blocks are sequentially and periodically selected as an object to be refreshed. The refreshed block is changed among all the blocks so that all the blocks will be refreshed during a given time. A decision is made as to whether or not refreshment is done for each of the blocks. The refreshment controller 5 outputs the refreshment instruction signal 7 in an active state to the data-processing mode selector 8 for each of blocks to be refreshed. The ratio of the number of refreshed blocks in a frame to the total number of blocks composing one frame is equal to a predetermined ratio chosen such that refreshing all the blocks will be completed for about 10 seconds. The period of refreshing all the blocks is referred to as a refreshment period.

In the case where the refreshment instruction signal 7 is active, the data-processing mode selector 8 commands selection of intra-frame data processing. In the case where the refreshment instruction signal 7 is inactive, the data-processing mode selector 8 commands selection of one of inter-frame data processing and intra-frame data processing in response to the input image signal 2 and the prediction error signal 4. When the selection of the intra-frame data processing is commanded, the switch 10 is controlled by the change control signal 9 so that the input image signal 2 will be selected by the switch 9 to enable the intra-frame data processing. When the selection of the inter-frame data processing is commanded, the switch 10 is controlled by the change control signal 9 so that the prediction error signal 4 will be selected by the switch 9 to enable the inter-frame data processing.

The quantizer 14 is of the linear type. As described previously, the transform coefficients 13 outputted from the orthogonal transform device 12 are quantized by the quantizer 14 with the quantization step size represented by the data 33, so that the transform coefficients 13 are converted by the quantizer 14 into the second transform coefficients 16. The quantizer controller 31 varies the quantization step size in accordance with the buffer remaining-code-amount represented by the signal 21. The quantizer 14 and the encoder 31 are related so that the number of bits of the output codes 18 from the encoder 17 will depend on the quantization step size used by the quantizer 14. The quantizer 14, the encoder 17, the transmission buffer 19, and the quantizer controller 31 form a closed-loop control circuit which serves to maintain the quantity (the amount or the number of bits) of codes in the transmission buffer 19 at or below a desired quantity.

As described previously, the signal selection by the switch 29 is changed in response to the change control signal 9. When the selection of the inter-frame data processing is commanded by the data-processing mode selector 8, the switch 29 is controlled by the change control signal 9 so that the inter-frame prediction signal 3 will be selected by the switch 29 to enable the inter-frame data processing. When the selection of the intra-frame data processing is commanded by the data-processing mode selector 8, the switch 29 is controlled by the change control signal 9 so that the zero signal will be selected by the switch 29 to enable the intra-frame data processing. The output signal 26 from the switch 29 and the output reproduction signal 24 from the inverse transform device 23 are combined into the decoded signal 27 by the adder 25. The decoded signal 27 is stored into a store section of the variable-delay frame memory 28. The variable-delay frame memory 28 has a motion detector which compares the stored decoded signal 27 and the input image signal 2, and which detects a motion vector on the basis of the result of the comparison between the signals 27 and 2. The detected motion vector represents a motion of the image represented by the input image signal 2. The variable-delay frame memory 28 has a motion compensator which subjects the stored decoded signal 27 to motion compensation in response to the motion vector, and thereby which converts the stored decoded signal 27 into the motion-compensated inter-frame prediction signal 3. The detected motion vector is directly or indirectly used as the moving/stationary information signal 32.

As described previously, the quantizer controller 31 controls the quantization step size data 33 in response to the refreshment signal 7, the buffer remaining-code-amount signal 21, and the moving/stationary information signal 32. The quantizer controller 31 will be further described hereinafter.

Figure 5:
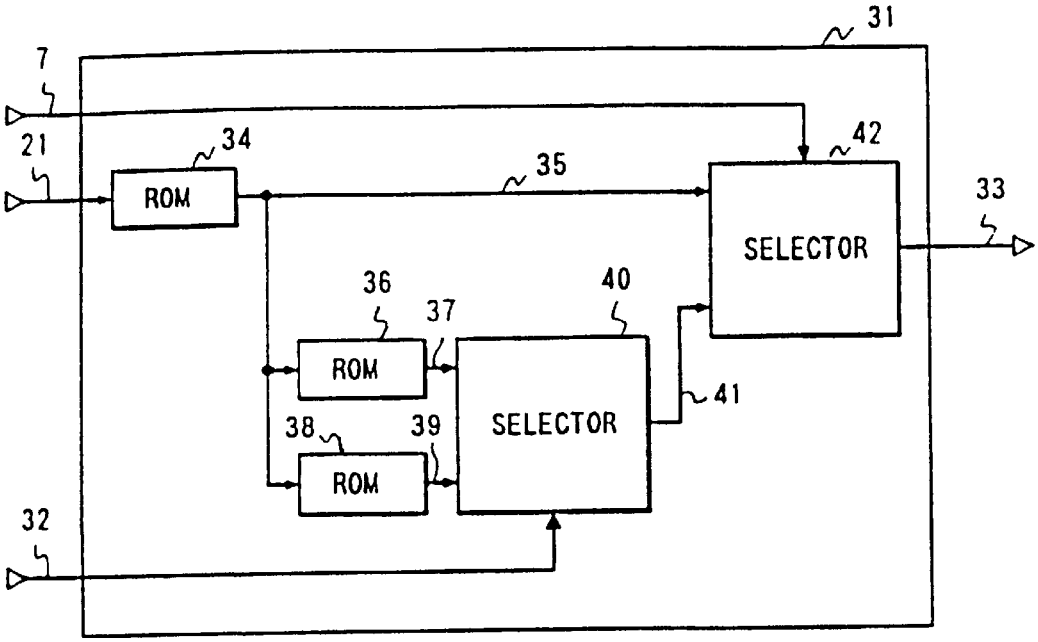
FIG. 5 is a block diagram of the quantizer controller of FIG. 4.

As shown in FIG. 5, the quantizer controller 31 includes a ROM 34 storing data representing first different quantization step sizes arranged and designed for nonrefreshed blocks. The buffer remaining-code-amount signal 21 is fed to the ROM 34 as an address signal, and the ROM 34 outputs data 35 of a first quantization step size which varies as a function of the buffer remaining-code-amount represented by the signal 21. The first quantization step size data 35 are fed to a selector 42 as nonrefreshed-block quantization step size data.

The quantizer controller 31 also includes ROMs 36 and 38. The ROM 36 stores data representing second different quantization step sizes arranged and designed for refreshed moving-region blocks. Characteristics of the second quantization step sizes in the ROM 36 differ from characteristics of the first quantization step sizes in the ROM 34. The first quantization step size data 35 are fed to the ROM 36 as an address signal, and the ROM 36 outputs data 37 of a second quantization step size which varies as a function of the first quantization step size represented by the data 35. The ROM 38 stores data representing third different quantization step sizes arranged and designed for refreshed stationary-region blocks. Characteristics of the third quantization step sizes in the ROM 38 differ from the characteristics of the first quantization step sizes in the ROM 34, and also differ from characteristics of the second quantization step sizes in the ROM 36. The first quantization step size data 35 are fed to the ROM 38 as an address signal, and the ROM 38 outputs data 39 of a third quantization step size which varies as a function of the first quantization step size represented by the data 35. The second quantization step size data 37 and the third quantization step size data 39 are fed to a selector 40. The selector 40 receives the moving/stationary information signal 32. The moving/stationary information signal 32 represents whether the block corresponding to the transform coefficient data 13 quantized by the quantizer 14 agrees with a moving-image part or a stationary-image part. The selector 40 selects one of the second quantization step size data 37 and the third quantization step size data 39 in response to the moving/stationary information signal 32, and outputs the selected data as refreshed-block quantization step size data 41. Specifically, when the block corresponding to the transform coefficient data 13 quantized by the quantizer 14 agrees with a moving-image part, the second quantization step size data 37 are selected by the selector 40. When the block corresponding to the transform coefficient data 13 quantized by the quantizer 14 agrees with a stationary-image part, the third quantization step size data 39 are selected by the selector 40. The refreshed-block quantization step size data 41 are fed to the selector 42.

The selector 42 receives the refreshment instruction signal 7. The refreshment instruction signal 7 represents whether the block corresponding to the transform coefficient data 13 quantized by the quantizer 14 agrees with a refreshed block or a nonrefreshed block. The selector 42 selects one of the nonrefreshed-block quantization step size data 35 and the refreshed-block quantization step size data 41 in response to the refreshment instruction signal 7, and outputs the selected data as the quantization step size data 33. Specifically, when the block corresponding to the transform coefficient data 13 quantized by the quantizer 14 agrees with a nonrefreshed block, the nonrefreshed-block quantization step size data 35 are selected by the selector 42. When the block corresponding to the transform coefficient data 13 quantized by the quantizer 14 agrees with a refreshed block, the refreshed-block quantization step size data 41 are selected by the selector 42.

As understood from the previous description, in the case where the block corresponding to the transform coefficient data 13 quantized by the quantizer 14 agrees with a nonrefreshed block, the first quantization step size designed for a nonrefreshed block and outputted from the ROM 34 is used by the quantizer 14. In the case where the block corresponding to the transform coefficient data 13 quantized by the quantizer 14 agrees with a refreshed moving-region block, the second quantization step size designed for a refreshed moving-region block and outputted from the ROM 36 is used by the quantizer 14. In the case where the block corresponding to the transform coefficient data 13 quantized by the quantizer 14 agrees with a refreshed stationary-region block, the third quantization step size designed for a refreshed stationary-region block and outputted from the ROM 38 is used by the quantizer 14. Thus, the quantization step size used by the quantizer 14 is changed in response to whether the block corresponding to the transform coefficient data 13 quantized by the quantizer 14 agrees with a refreshed block or a nonrefreshed block. Therefore, refreshed blocks can be prevented from deteriorating in image quality.

Figure 6A:
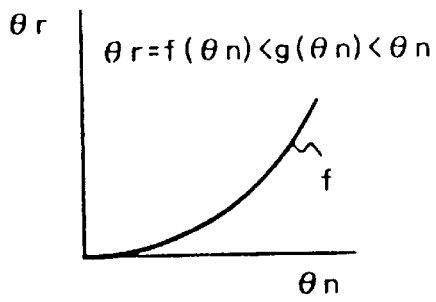
FIGS. 6(*a*) through 8(*b*) are diagrams showing relations between a refreshed-block quantization step size and a nonrefreshed-block quantization step size in the apparatus of FIG. 4.
Figure 6B:
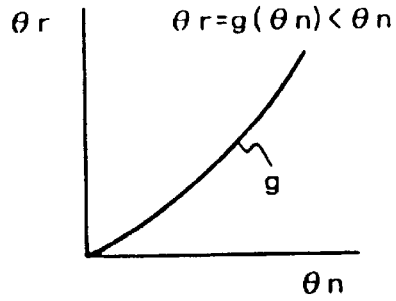

A further description will be given of the relation between the nonrefreshed-block quantization step size and the refreshed-block quantization step size represented by the data 35 and 41 respectively which occur at the same time. The characters $\theta n$ and $\theta r$ are now introduced to indicate the nonrefreshed-block quantization step size and the refreshed-block quantization step size respectively. As shown in FIG. 6(*a*), in the case where the block corresponding to the transform coefficient data 13 quantized by the quantizer 14 agrees with a stationary-region block, the refreshed-block quantization step size $\theta r$ is smaller than the nonrefreshed-block quantization step size θn as is determined by a downwardly-facing convex function "f". As shown in FIG. 6(*b*), in the case where the block corresponding to the transform coefficient data 13 quantized by the quantizer 14 agrees with a moving-region block, the refreshed-block quantization step size θr is smaller than the nonrefreshed-block quantization step size θn as is determined by a downwardly-facing convex function "g". The values of the function "g" are greater than the corresponding values of the function "f".

Figure 7A:
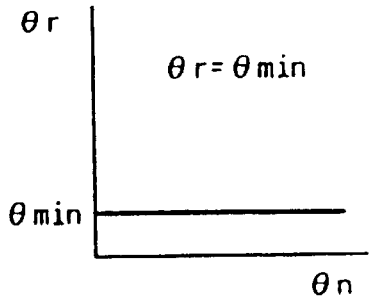
Figure 7B:
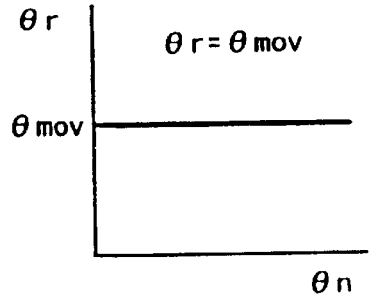

It should be noted that the relation between the nonrefreshed-block quantization step size θn and the refreshed-block quantization step size θr may be modified as follows. According to a first modification, as shown in FIG. 7(*a*), in the case where the block corresponding to the transform coefficient data 13 quantized by the quantizer 14 agrees with a stationary-region block, the refreshed-block quantization step size θr is fixed at a predetermined minimum value θmin while the nonrefreshed-block quantization step size θn varies. According to the first modification, as shown in FIG. 7(*b*), in the case where the block corresponding to the transform coefficient data 13 quantized by the quantizer 14 agrees with a moving-region block, the refreshed-block quantization step size θr is fixed at a predetermined value θmov while the nonrefreshed-block quantization step size θn varies. The predetermined value θmov is greater than the minimum value θmin.

Figure 8A:
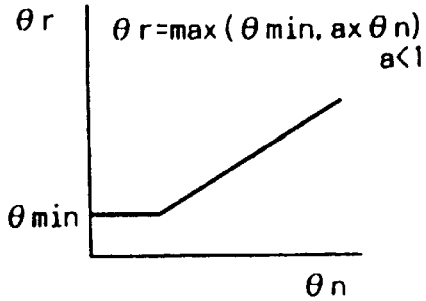
Figure 8B:
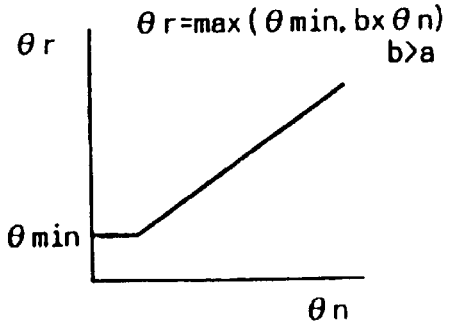

According to a second modification, as shown in FIG. 8(*a*), in the case where the block corresponding to the transform coefficient data 13 quantized by the quantizer 14 agrees with a stationary-region block, the refreshed-block quantization step size θr is equal to the greater of the minimum value θmin and the product of a predetermined positive constant "a" and the nonrefreshed-block quantization step size θn. The constant "a" is smaller than 1. According to the second modification, as shown in FIG. 8(*b*) in the case where the block corresponding to the transform coefficient data 13 quantized by the quantizer 14 agrees with a moving-region block, the refreshed-block quantization step size θr is equal to the greater of the minimum value θmin and the product of a predetermined positive constant "b" and the nonrefreshed-block quantization step size θn. The constant "b" is greater than the constant "a" but smaller than 1.

Figure 9:
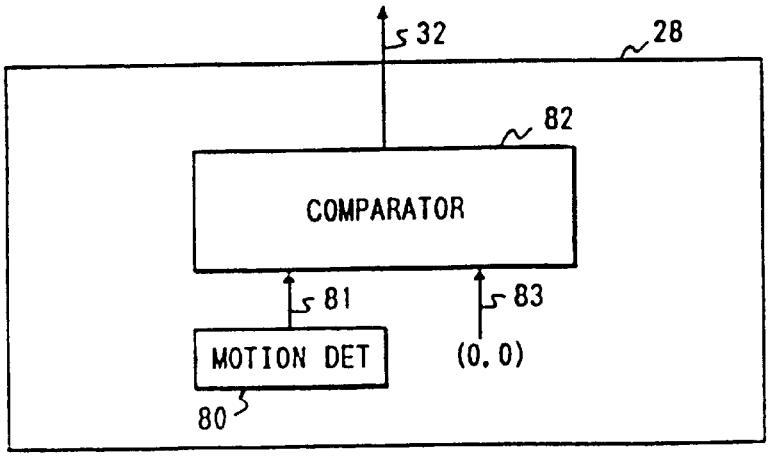
FIG. 9 is a block diagram of a portion of the variable-delay frame memory of FIG. 4.

The generation of the moving/stationary information signal 32 will be described hereinafter. As shown in FIG. 9, the variable-delay frame memory 28 includes a motion detector 80 generating data 81 representative of a motion vector for each of blocks composing a frame. The motion vector data 81 are outputted from the motion detector 80 to a comparator 82 within the variable-delay frame memory 28. The motion vector is expressed by a two-dimensional notation having horizontal and vertical components X and Y, and is denoted as (X,Y). Data 83 representing a predetermined vector (0,0), that is, a stationary-state-indicating vector, are fed to the comparator 82. The comparator 82 compares the motion vector data 81 and the stationary-state vector data 83. When the motion vector data 81 differ from the, stationary-state vector data 83, that is, when at least one of the components X and Y of the motion vector differs from "0", the comparator 82 outputs a "1" signal as the moving/stationary information signal 32. When the motion vector data 81 are equal to the stationary-state vector data 83, that is, when both the components X and Y of the motion vector are equal to "0", the comparator 82 outputs a "0" signal as the moving/stationary information signal 32.

What is claimed is:

1. A moving-image signal encoding apparatus comprising:

a transmission buffer memory;

means for determining a first quantization step size for a normal block other than a refreshed block on the basis of an occupied capacity of the buffer memory;

means for determining a second quantization step size for the refreshed block on the basis of the first quantization step size;

means for generating a refreshment instruction signal; and means for selecting one of the first quantization step size and the second quantization step size in response to the refreshment instruction signal.

2. A moving-image signal encoding apparatus comprising:

a transmission buffer memory;

means for determining a first quantization step size for a normal block other than a refreshed block on the basis of an occupied capacity of the buffer memory;

means for determining a second quantization step size for the refreshed block in a moving region on the basis of the first quantization step size;

means for determining a third quantization step size for the refreshed block in a stationary region on the basis of the first quantization step size;

means for generating a refreshment instruction signal;

means for generating a moving/stationary information signal; and means for selecting one of the first quantization step size, the second quantization step size, and the third quantization step size in response to the refreshment instruction signal and the moving/stationary information signal.

3. A moving-image signal encoding apparatus comprising:

means for refreshing a portion of image data;

means for quantizing information in the image data with a variable quantization step size;

means for varying the quantization step size in the quantizing means in response to whether or not the information quantized by the quantizing means corresponds to the refreshed portion of the image data; and means for, in cases where the information quantized by the quantizing means corresponds to the refreshed portion of the image data, varying the quantization step size in the quantizing means in response to whether the information quantized by the quantizing means relates to a moving image region or a stationary image region.

*4. A system comprising a moving-image signal encoding apparatus and a decoding apparatus, the encoding apparatus comprising:*

(*a*) *a transmission buffer memory;*

(*b*) *means for determining a first quantization step size for a normal block other than a refreshed block on the basis of an occupied capacity of the buffer memory;*

(*c*) *means for determining a second quantization step size for the refreshed block on the basis of the first quantization step size;*

(*d*) *means for generating a refreshment instruction signal;*

(*e*) *means for selecting one of the first quantization step size and the second quantization step size in response to the refreshment instruction signal;*

(*f*) *means for encoding a signal quantized in accordance with the selected one of the first and second quantization step sizes and for outputting an encoded signal; and*

(*g*) *a decoder apparatus receiving said encoded signal for decoding said encoded signal.*

*5. A system comprising a moving-image signal encoding apparatus and a decoding apparatus, the encoding apparatus comprising:*

(*a*) *a transmission buffer memory;*

(*b*) *means for determining a first quantization step size for a normal block other than a refreshed block on the basis of an occupied capacity of the buffer memory;*

(*c*) *means for determining a second quantization step size for the refreshed block in a moving region on the basis of the first quantization step size;*

(*d*) *means for determining a third quantization step size for the refreshed block in a stationary region on the basis of the first quantization step size;*

(*e*) *means for generating a refreshment instruction signal;*

(*f*) *means for generating a moving/stationary information signal;*

(*g*) *means for selecting one of the first quantization step size, the second quantization step size, and the third quantization step size in response to the refreshment instruction signal and the moving/stationary information signal;*

(*h*) *means for encoding a signal quantized in accordance with the selected one of said first and second quantization step sizes and for outputting an encoded signal; and*

(*i*) *a decoder apparatus receiving said encoded signal for decoding said encoded signal.*

*6. A system comprising a moving-image signal encoding apparatus and a decoding apparatus, the encoding apparatus comprising:*

(*a*) *means for refreshing a portion of image data;*

(*b*) *means for quantizing information in the image data with a variable quantization step size;*

(*c*) *means for varying the quantization step size in the quantizing means in response to whether or not the information quantized by the quantizing means corresponds to the refreshed portion of the image data;*

(*d*) *means for, in cases where the information quantized by the quantizing means corresponds to the refreshed portion of the image data, varying the quantization step size in the quantizing means in response to whether the information quantized by the quantizing means relates to a moving image region or a stationary image region;*

(*e*) *means for encoding an output signal of the quantizing means; and*

(*f*) *a decoder apparatus receiving an encoded signal from said encoding means for decoding said encoded signal.*

*7. A system comprising a moving-image signal encoding apparatus and a transmitting apparatus for transmitting an output signal of the encoding apparatus,*

*the encoding apparatus comprising:*

(*a*) *a transmission buffer memory;*

(*b*) *means for determining a first quantization step size for a normal block other than a refreshed block on the basis of an occupied capacity of the buffer memory;*

(*c*) *means for determining a second quantization step size for the refreshed block on the basis of the first quantization step size;*

(*d*) *means for generating a refreshment instruction signal;*

(*e*) *means for selecting one of the first quantization step size and the second quantization step size in response to the refreshment instruction signal; and*

(*f*) *means for encoding a signal quantized in accordance with the selected one of said first and second quantization step sizes and for outputting an encoded signal;*

*the transmitting apparatus comprising*

(*g*) *using means for transmitting the encoded signal as an output signal of the encoding apparatus.*

*8. A system comprising a moving-image signal encoding apparatus and a transmitting apparatus for transmitting an output signal of the encoding apparatus,*

*the encoding apparatus, comprising:*

(*a*) *a transmission buffer memory;*

(*b*) *means for determining a first quantization step size for a normal block other than a refreshed block on the basis of an occupied capacity of the buffer memory;*

(*c*) *means for determining a second quantization step size for the refreshed block in a moving region on the basis of the first quantization step size;*

(*d*) *means for determining a third quantization step size for the refreshed block in a stationary region on the basis of the first quantization step size;*

(*e*) *means for generating a refreshment instruction signal;*

(*f*) *means for generating a moving/stationary information signal;*

(*g*) *means for selecting one of the first quantization step size, the second quantization step size, and the third quantization step size in response to the refreshment instruction signal and the moving/stationary information signal; and*

(*h*) *means for encoding a signal quantized in accordance with the selected one of said first and second quantization step sizes and for outputting an encoded signal;*

*the transmitting apparatus comprising*

(*i*) *using means for transmitting the encoded signal as an output signal of the encoding apparatus.*

*9. A system comprising a moving-image signal encoding apparatus and means for transmitting an output signal of the encoding apparatus, the encoding apparatus comprising:*

(*a*) *means for refreshing a portion of image data;*

(*b*) *means for quantizing information in the image data with a variable quantization step size;*

(*c*) *means for varying the quantization step size in the quantizing means in response to whether or not the information quantized by the quantizing means corresponds to the refreshed portion of the image data;*

(*d*) *means for, in cases where the information quantized by the quantizing means corresponds to the refreshed portion of the image data, varying the quantization step size in the quantizing means in response to whether the information quantized by the quantizing means relates to a moving image region or a stationary image region;*

(*e*) *means for encoding an output signal of the quantizing means; and*

(*f*) *means for using an output signal of the encoding means as the output signal of the encoding apparatus.*

*10. A moving-image signal encoding apparatus comprising:*

*means* (*1*) *for generating an inter-frame prediction error signal* (*4*) *from an input image signal* (*2*) *and an inter-frame prediction signal* (*3*);

*selecting means (10) for selecting one of the input image signal (2) and the inter-frame prediction error signal (4);*

*control means (31) for determining a quantization level (33);*

*quantizing means (14) for quantizing the signal selected by the selecting means in response to the quantization level determined by the control means; and*

*means (7, 8, 9) for interlinking said selecting means (10) and said control means (31) so that the quantization level (33) determined by the control means (31) depends on which of the input image signal (2) and the inter-frame prediction error signal (4) is selected by the selecting means (10),*

*further comprising a transmission buffer (19) following the quantizing means and outputting a buffer remaining-code-amount signal (21), wherein said control means (31) varies said quantization level (33) in response to the buffer remaining-code-amount signal (21).*

*11. A moving-image signal encoding apparatus comprising:*

*means (1) for generating an inter-frame prediction error signal (4) from an input image signal (2) and an inter-frame prediction signal (3);*

*selecting means (10) for selecting one of the input image signal (2) and the inter-frame prediction error signal (4);*

*control means (31) for determining a quantization level (33);*

*quantizing means (14) for quantizing the signal selected by the selecting means in response to the quantization level determined by the control means; and*

*means (7, 8, 9) for interlinking said selecting means (10) and said control means (31) so that the quantization level (33) determined by the control means (31) depends on which of the input image signal (2) and the inter-frame prediction error signal (4) is selected by the selecting means (10),*

*further comprising means (28) for generating a moving/stationary information signal (32) representative of moving/stationary information related to the input image signal (2), wherein said control means (31) varies said quantization level (33) in response to the moving/stationary information signal (32).*

*12. The moving-image signal encoding apparatus of claim 10, further comprising means (28) for generating a moving/stationary information signal (32) representative of moving/stationary information related to the input image signal (2), wherein said control means (31) varies said quantization level (33) in response to the moving/stationary information signal (32).*

* * * * *